United States Patent Office 2,974,479
Patented Mar. 14, 1961

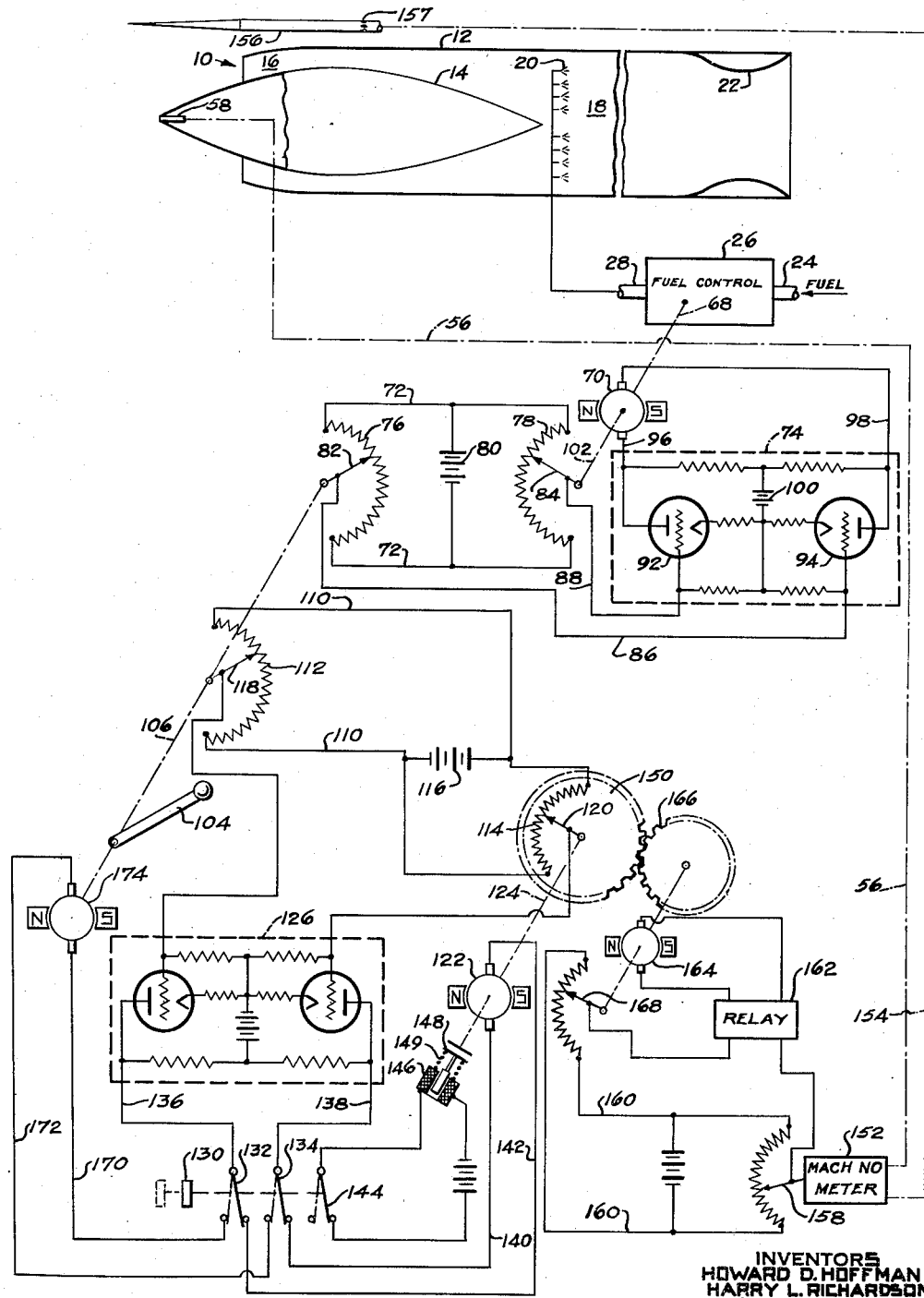

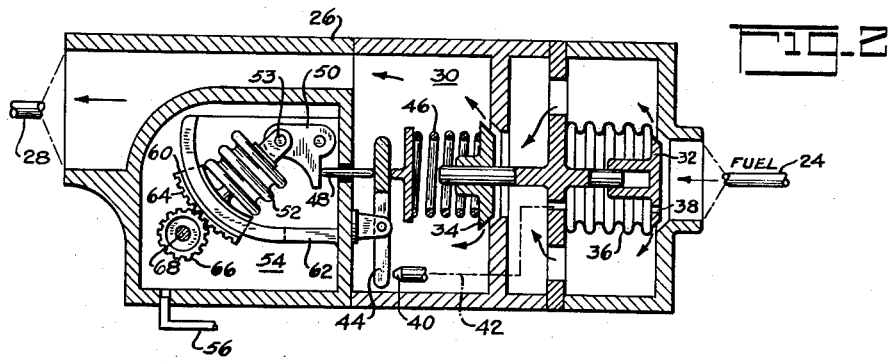
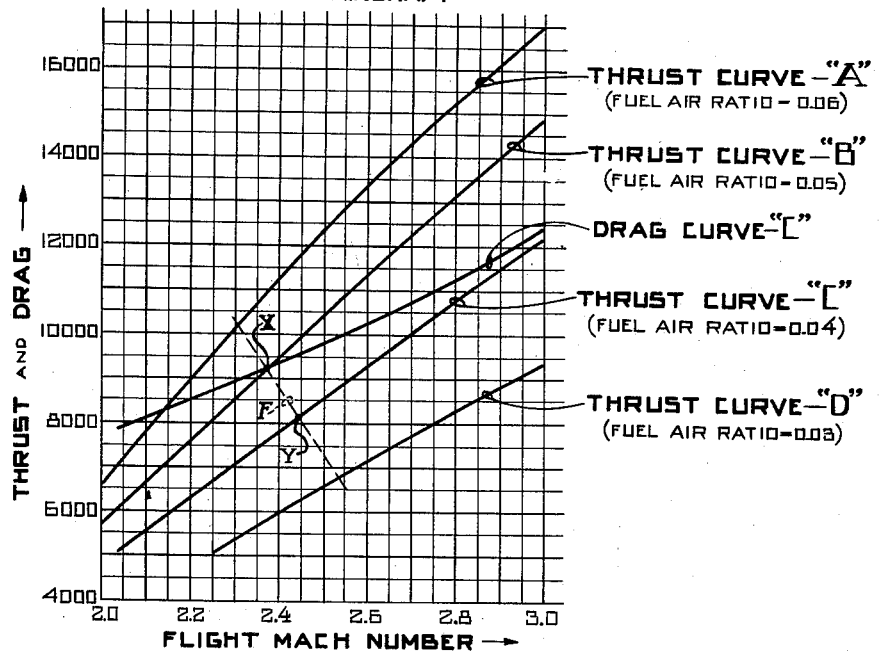

2,974,479

MANUAL OR AIR SPEED FUEL CONTROL FOR A JET ENGINE

Howard D. Hoffman, Fair Lawn, and Harry L. Richardson, River Edge, N.J., assignors to Curtiss-Wright Corporation, a corporation of Delaware Filed July 1, 1954, Ser. No. 440,778

9 Claims. (Cl. 60—35.6)

This invention relates to jet engines and is particularly directed to means for controlling the thrust output of a jet engine for supersonic aircraft.

In certain jet propelled aircraft at supersonic flight speeds the rate of increase of engine thrust with increase in flight speed is greater than the accompanying increase in aircraft drag. Because of this characteristic of such aircraft, stable operation at a particular supersonic flight speed requires constant manipulation of the controls by the pilot.

An object of the present invention comprises the provision of a novel and simple control system for a jet engine for such an aircraft, said system providing for both manual and automatic control of the aircraft flight speed. In accordance with the present invention, when the system is set for manual control the pilot can vary the flight speed at will, for example by varying the fuel air ratio of the engine combustion mixture and when set for automatic control the system will automatically maintain substantially the then existing flight speed by automatically varying said fuel air ratio.

Fig. 1 is a diagrammatic view of an aircraft jet engine control system embodying the invention;

Fig. 2 is a sectional view of the fuel control mechanism of Fig. 1; and

Fig. 3 is a graph of typical thrust and drag curves of a ram jet aircraft.

Referring first to Fig. 1 of the drawing, reference numeral 10 designates a ram jet engine comprising a duct-like housing member 12 having a center body 14 at its forward end forming an annular air entrance opening 16. In addition the engine includes a combustion chamber 18 intermediate the ends of the member 12 to which fuel is supplied by burner apparatus 20. A nozzle 22 is formed at the rear end of the housing member 12 through which the exhaust gases discharge for providing forward propulsive thrust. Fuel is supplied to the burner apparatus 20 from a supply conduit 24 and thence through a fuel control mechanism 26 and a conduit 28. The fuel control apparatus 26 is only schematically indicated in Fig. 1 but is more fully illustrated in Fig. 2.

The fuel control apparatus 26 preferably is similar to that fully disclosed in copending application Serial No. 286,364 filed May 6, 1952. As illustrated in Fig. 2, the apparatus 26 has a passage 30 therethrough connecting the fuel conduits 24 and 28. Said apparatus includes a main valve 32 and an auxiliary valve 34 serially disposed in said passage 30 downstream of said main valve. The main valve 32 is supported by and is urged in a closing direction by an elastically flexible bellows 36, the interior of which communicates with the upstream side of the main valve through a restricted passage 38. A nozzle 40 communicates with the interior of the bellows 36 via a passage 42 whereby a small quantity of fuel flows through the passage 42 and discharges into the fuel passage 30 through said nozzle 40 downstream of the auxiliary valve 34. One end of a lever 44 overlies the discharge end of the nozzle 40 to function as a baffle member for said nozzle. A spring 46 is disposed between the lever 44 and the auxiliary valve 34 so as to urge the lever 44 in a nozzle closing direction and to urge the auxiliary valve 34 in a closing direction against the fuel pressure differential across the valve. The force of the spring 46 on the lever 44 is opposed by a second force transmitted thereagainst by a pin 48 from a lever 50 and a bellows 52 pivotally connected to said lever at 53. The bellows 52 is disposed in a closed chamber 54, which, through a passage 56 and total head tube 58, is subjected to a pressure proportional to the impact pressure of the surrounding air relative to the engine 10, said tube 58 being directed upstream into the surrounding approaching air flow.

With this construction of the fuel control apparatus 26, if for example, the pressure in the chamber 54 acting against the bellows 52 increases, the increased force of the bellows 52 moves the lever 44 away from the nozzle 40 to increase the leakage fuel flow through said nozzle. This increase in fuel flow through the nozzle 40 increases the fuel pressure drop across the restriction 38 thereby increasing the valve opening force acting on the main valve 32 against the elasticity of the bellows 40. The main valve 32 thereupon moves in an opening direction to increase the fuel flow thereby increasing the fuel pressure differential on the auxiliary valve 34 and moving said auxiliary valve in an opening direction. This action continues until the increase in the force exerted by the spring 46 on the lever 44 rebalances the forces on said lever. In this way, as more fully explained in said copending application the apparatus 26 regulates the fuel flow therethrough in proportion to the magnitude of the pressure in the chamber 54.

As stated, the chamber 54 is connected to a total head tube 58 through a passage 56, said total head tube being directed upstream into the surrounding air stream so that the pressure in the chamber 54 is proportional to the impact pressure of the surrounding atmosphere relative to the engine 10. At supersonic flight speeds this impact pressure is less than the total pressure by the normal shock losses across the front of tube 58. As also explained in said copending application, in at least a limited supersonic speed range, said impact pressure is a measure of the mass air flow into the engine whereby the fuel supplied to the combustion chamber 18 under control of the apparatus 26 is proportional to the mass air flow into the engine 10.

The constant of proportionality between the mass fuel and air flow to the engine combustion chamber 18 can be changed by varying the moment arm of the force exerted by the bellows 52 on the lever 50 thereby changing the fuel-air ratio of the combustible mixture in said combustion chamber. Thus any increase or decrease in said moment arm results in an increase or decrease respectively of said fuel-air ratio. Accordingly, since the thrust output of the engine 10 can be increased and decreased by increasing and decreasing respectively the fuel-air ratio of said combustible mixture said thrust output can be increased and decreased by increasing and decreasing the moment arm of the force of the bellows 52 on the lever 50. For this purpose, the bellows 52 is mounted for pivotal movement about its pivotal connection 53 to the lever 50 so that the moment arm of its force on said lever can be varied. The anchored end of the bellows 52 has a circular sector 60 which is mounted for sliding movement along a circular guideway 62. The sector 62 also has gear teeth 64 meshing with a gear 66 connected to a gear drive shaft 68 so that rotation of the gear 66 causes the bellows 52 to swing about its pivotal connection 53. As seen in Fig. 2 counterclockwise swinging movement of the bellows 52 increases the moment arm of its force on the lever 50 thereby increasing the fuel-air ratio of the combustible mixture supplied to the combustion chamber 18 to increase the engine thrust output. Clockwise swinging movement of the bellows 52 decreases said moment arm to decrease the engine fuel-air ratio and its thrust output.

Referring again to Fig. 1, the shaft 68 of the fuel-air ratio changing gear 66 is connected to a motor 70 which, as illustrated, is a D.C. (direct current) permanent magnet type motor. The motor 70 is controlled by a D.C. bridge circuit 72 and an electronic relay 74. The bridge circuit 72 includes a pair of potentiometer resistances 76 and 78, said resistances being connected in parallel across a D.C. voltage source 80 and having movable contact arms 82 and 84 respectively. The contacts 82 and 84 are connected by wires 86 and 88 to the input of the relay 74. As illustrated, the relay 74 is an electronic relay having a pair of electronic tubes 92 and 94 with the contact 82 being connected to the grid of the tube 94 and the contact 84 being connected to the grid of the tube 92. The output of the relay 74 is connected by wires 96 and 98 to the motor 70, the wire 96 being connected to the plate of the tube 92 and the wire 98 being connected to the plate of the tube 94. The tubes 92 and 94 are connected in parallel to the D.C. voltage source 100 through suitable resistances and the grids and filaments of said tubes are similarly connected together by suitable resistances.

With this construction and connection of the relay 74, the motor 70 operates whenever the bridge circuit 72 is unbalanced, said motor operating in one direction or the other depending on which of the contacts 84 or 82 is at the higher electric potential. In addition to being connected to the fuel air ratio changing shaft 68 for adjustment of the moment arm of the bellows 52, the motor 70 is connected to the contact 84, by means schematically indicated at 102, so that when the motor 70 operates, the contact 84 is adjusted in a direction to rebalance the bridge circuit 72. Accordingly, any adjustment of the contact 82 unbalances the bridge circuit 72 and results in operation of the motor 70 to rebalance the bridge circuit and at the same time this operation of the motor 70 changes the engine fuel air ratio in a direction depending on the direction of the adjustment of the contact 82. Since the circuit 72, when balanced, is ineffective to cause operation of the motor 70 the balanced condition of the circuit may be termed its neutral condition.

The contact 82 is mechanically connected to a lever 104 by means of a shaft, schematically indicated at 106, whereby the lever 104 is manually movable by the pilot for varying the fuel-air ratio.

A second bridge circuit 110 has a pair of potentiometer resistances 112 and 114, said resistances being connected in parallel to a D.C. voltage source 116 and having adjustable contacts 118 and 120 respectively. The contact 118 is connected to the shaft 106 for simultaneous adjustment with the contact 82. The contact 120 is connected to a D.C. permanent magnet type motor 122 by means schematically indicated at 124. The motor 122 is controllable by the bridge circuit 110 through a relay 126 in a manner similar to the control of the motor 70 by the bridge circuit 72 through the relay 70.

A multi-contact-switch 130 having switch arms 132 and 134 controls the output circuit on the relay 126. This switch 130 has a first position (illustrated in full lines in Fig. 1) in which the control system is set for manual control by lever 104 and said switch is movable to the left to a second position (illustrated in dot and dash lines in Fig. 1) for automatic control operation. With the switch 130 in the manual control position illustrated, the switch arms 132 and 134 connect the output wires 136 and 138 of the relay 126 to the wires 140 and 142 of the motor 122 so that the motor 122 is automatically operative to control the position of the contact 120 to keep the bridge circuit 110 in balance. The switch 130 also has a switch arm 144 which, in the manual control position of said switch, completes a circuit to a solenoid 146 which is operatively connected to a brake shoe 148 for the motor 122. When energized, the solenoid 146 holds the brake 148 in its disengaged position against a spring 149.

The potentiometer resistance 114 is mounted on a rotatable table 150 for rotative adjustment in response to changes in the flight Mach number. Any suitable Mach No. meter may be used for rotatively positioning the table 150. The flight Mach No. is a function of the impact pressure of the surrounding atmosphere relative to the engine 10 and the static pressure of said atmosphere. Hence, these two pressures can be combined to provide an indication of said Mach No. As schematically illustrated, a Mach No. meter 152 is connected by a passage 154 to a static pressure tube 156 directed forwardly in said surrounding atmosphere and to the impact pressure line 56 to move an arm 158 of said meter to a position corresponding to the flight speed Mach No. As illustrated, the static tube 156 has side openings 157 through which the static pressure of the surrounding atmosphere is transmitted into said tube. The Mach No. meter arm 158 may be operatively connected to the rotatable table 150 in any suitable manner, for rotating said table to a position corresponding to the position of the arm 158 and therefore to a position dependent on the magnitude of the flight speed. For this purpose, in the system illustrated, the arm 158 comprises a movable contact which is operatively connected to a bridge circuit 160 which in turn is connected to a relay 162 for controlling a D.C. permanent magnet type motor 164, said motor being geared to the table 150 by a pinion 166 and being operatively connected to a contact 168 for rebalancing the bridge circuit 160. Operation of the motor 164 in response to movement of the contact arm 158 is substantially the same as operation of the motor 70 in response to movement of the contact arm 82.

The switch 130 can be moved to the left to a second position (illustrated by dot and dash lines in Fig. 1) in which the contacts 132 and 134 are connected by lines 170 and 172 to a D.C. permanent magnet type motor 174, said motor being connected to the shaft 106 for operative connection to the potentiometer arms 118 and 82. With the switch 130 in this left hand position, the system is set for automatic control and any unbalance of the bridge circuit 110 now results in adjustment of the motor 174, instead of the motor 122, under control of the relay 126 to move the contact 118 in a direction to rebalance said bridge circuit. At the same time operation of the motor 174 is effective to move the contact 82 so as to adjust the engine fuel air ratio as previously described.

When the switch 130 is in its automatic position (left hand or dot and dash position in Fig. 1) the switch arm 144 is disengaged from the circuit of the solenoid 146 whereupon the spring 149 engages the brake 148 to hold the motor 122 and contact 120 in a fixed position.

The control system described operates as follows: With the switch 130 in its manual position (right hand or full line position in Fig. 1) the lever 104 can be manually adjusted by the pilot to move the contact arm 82 so as to cause the motor 70 to rotate an amount corresponding to the movement of the arm 82. Movement of the motor 70 is effective to vary the moment arm and the force of the fuel regulator bellows 52 to vary the engine fuel air ratio. At the same time the potentiometer contact arm 118 is also adjusted by the control arm 104 whereby the position of the contacts 118 and 82 relative to their respective resistances are both a measure of the engine fuel air ratio. This adjustment of the contact 118 unbalances the bridge circuit 110 whereupon the motor 122 on the control of the relay 126 adjusts the contact 120 to rebalance said bridge circuit so that the position of the contact 120 relative to the resistance 114 is the same as that of the contact 118 relative to the resistance 112 whereby the relative positions of the contact 120 and resistance 114 is also a measure of the position of the power lever 104 and therefore of the engine fuel air ratio. This is true even though the resistance 114 is mounted on the table 150, the rotative position of which depends on the flight Mach No., because any adjustment of the table 150 in response to a change in said flight Mach No. also unbalances the bridge circuit 110 whereupon the motor 122 operates to move the contact 120 to rebalance said circuit thereby restoring said relative positions of the contact 120 and resistance 114.

When the pilot reaches a flight Mach No. at which he desires to fly steady, if the switch 130 is left in said manual position he must constantly manipulate the controls to maintain said speed substantially constant. This can best be seen by referring to the graphical view of Fig. 3. Fig. 3 illustrates typical curves of thrust versus flight speed Mach No. at different fuel air ratios for a ram jet installation in a high speed aircraft and said figure also illustrates the curve of aircraft drag versus said flight Mach No. for said aircraft. In Fig. 3, curves A, B, C, D are the thrust curves at progressively decreasing fuel air ratios and curve E is said drag curve. As is apparent from said curves if the aircraft is flying steady, that is at a condition at which the aircraft thrust and drag forces are in balance, for example at condition X, then if the speed of the aircraft starts to accelerate, for example because of a change in aircraft altitude, the thrust would increase along the curve B at a faster rate than the drag would increase along the curve C. Hence once such acceleration starts the rate of acceleration would continually increase unless the pilot manipulated the control lever 104 to decrease the thrust by decreasing the engine fuel air ratio. Likewise, if while flying steady at said condition X, the aircraft would start to decelerate, because of a change in aircraft altitude, then once said deceleration starts the rate of deceleration would continually increase unless the pilot manipulated the control lever 104 to increase the engine thrust.

In accordance with the present invention, when the pilot reaches the desired flight Mach No., for example point X on Fig. 3, he can move the manually operable switch 130 to the left (Fig. 1) to its automatic control position. As previously stated while the aircraft has been flying with the switch 130 in its manual control position, the contact arm 118 is adjusted with the arm 82 and in addition, the contact arm 120 is automatically adjusted to maintain the contact arm 120 and resistance 114 at the same relative position as that of the contact 118 and resistance 112. This is true regardless of movement of the contact 118 by the pilot through the lever 104 and regardless of movement of the resistance 114 as a result of changes in the aircraft flight speed. Hence, when the switch 130 is moved to said automatic control position, the bridge circuit 110 is in balance and remains in balance as long as the aircraft flight speed remains at said desired value. If, however, the flight Mach No. should, for example, increase because of unbalance of the aircraft thrust and drag forces, then the Mach No. meter 152 is effective through the bridge circuit 160, relay 162 and motor 164 to rotate the resistance 114 to unbalance the bridge circuit 110. As a result of this unbalance of the bridge circuit 110, the relay 126 causes operation of the motor 174 in a direction to move the contact 118 to rebalance the bridge circuit 110 and to move the contact 82 in a direction to decrease the engine fuel-air ratio, thereby decreasing the engine thrust, until equality of the aircraft thrust and drag forces is again established. Likewise, any decrease in the flight Mach No. causes an unbalance of the bridge circuit 110 in the opposite direction whereupon the motor 174 operates in the opposite direction to move the contact 118 to rebalance said circuit and to move the contact 82 to increase the engine fuel air ratio and engine thrust so as to restore the equality between the aircraft thrust and drag forces. In this way when the switch 130 is in said automatic control position the system operates to automatically maintain the aircraft flight Mach No. substantially constant at the flight Mach No. existing at the time the switch 130 was moved from its manual control to its automatic control position. Dashed line F on Fig. 3 graphically illustrates the magnitude of the engine fuel air ratio increase or decrease produced by a given magnitude of decrease or increase, respectively, in the engine flight Mach No. For example if the engine flight Mach No. increases from that at the point X to that at the point Y (Fig. 3) the engine fuel air ratio is automatically decreased from that of curve B to that of curve C.

When set for automatic operation, the sensitivity of the system is indicated by the slope of said dashed line F, the steeper the slope of this line the higher the sensitivity. The system can be designed to have a desired sensitivity. For example the sensitivity can be increased by increasing the magnitude of the resistance 114 shifted from one side to the other of the contact 120 for a given change in flight Mach No. Likewise the sensitivity can be decreased by decreasing the magnitude of the resistance 114 shifted from one side to the other of the contact 120 for a given change in said flight Mach No.

The invention obviously is not limited to the specific details of the fuel regulating mechanism 26 illustrated in Fig. 2. In fact instead of controlling the engine fuel flow other means, as for example the area of the engine exhaust nozzle 22, could be controlled for regulating the engine thrust output. Because of its relative simplicity and ease of control, however, regulation of fuel flow to control engine thrust is preferred. In addition, instead of automatically controlling to a constant flight Mach No. the system could automatically control to a constant flight air speed or a constant flight ground speed by substituting an air speed or a ground speed meter for the meter 152 in Fig. 1. As used herein the phrase "flight speed" is intended to be sufficiently broad to include any such increase of the speed of the aircraft flight.

With the system illustrated in Fig. 1 the bridge circuit 110 is automatically maintained in a balanced condition even when the switch 130 is in its full line position for manual control of the engine flight speed. Obviously it is only essential that the bridge circuit 110 be in balance at the time the pilot moves the switch 130 to its automatic position (illustrated by dot and dash lines) and that said circuit be kept in balance while the system is automatically controlling the engine flight speed. For example if the pilot had time to adjust the contact 120 to balance the circuit 110 just before he moved the switch 130 to its automatic position then, if desired, the automatically operable motor 122 could be dispensed with.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A control system for an aircraft jet engine having means operable to regulate its thrust output; said system comprising a first member movable for effecting operation of an aircraft jet engine thrust regulating means; first motor means operable for moving said first member; a second movable member; second motor means operable for moving said second member; a third member automatically movable upon changes in flight speed; means operative in response to deviation of said first, second and third members from a predetermined relationship; and means selectively operable for operatively connecting said responsive means to either of said first and second motor means such that upon deviation of said members from said relation and when connected to said second motor means said responsive means is operative to move said second member in a direction for restoring said relation and when connected to said first motor means said responsive means is operative to move said first member in a direction for restoring said relation and for automatically regulating the engine thrust.

2. A control system for an aircraft jet engine having means operable to regulate its thrust output; said system comprising a first member movable for effecting operation of an aircraft jet engine thrust regulating means; first motor means operable for moving said first member; a second movable member; second motor means operable for moving said second member; a third member automatically movable upon changes in flight speed; means operative in response to deviation of said first, second and third members from a predetermined relationship; means selectively operable for operatively connecting said responsive means to either of said first and second motor means such that upon deviation of said members from said relation and when connected to said second motor means said responsive means is operative to move said second member in a direction for restoring said relation and when connected to said first motor means said responsive means is operative to move said first member in a direction for restoring said relation and for automatically regulating the engine thrust; and means for restraining movement of said second member when said responsive means is operatively connected to said first motor means.

3. A control system for an aircraft jet engine having means operable to regulate its thrust output; said system comprising a first member movable for effecting operation of an aircraft jet engine thrust regulating means; first motor means operable for moving said first member; a second movable member; second motor means operable for moving said second member; a stationary third member cooperable with and relative to which said first member is movable; a fourth member automatically movable with changes in flight speed and cooperable with and relative to which said second member is movable; means operative in response to changes in the relative positions of said first and third members and the relative positions of said second and fourth members; and means selectively operable for operatively connecting said responsive means to either of said first and second motor means for moving their respective first and second members so that a predetermined relation is automatically maintained between said relative positions and for automatically regulating the engine thrust when said responsive means is connected to said first motor means.

4. A control system for an aircraft jet engine having means operable to regulate its thrust output; said system comprising a first member movable for effecting operation of an aircraft jet engine thrust regulating means; first motor means operable for moving said first member; a second movable member; second motor means operable for moving said second member; a stationary third member cooperable with and relative to which said first member is movable; a fourth member automatically movable with changes in flight speed and cooperable with and relative to which said second member is movable; means operative in response to changes in the relative positions of said first and third members and the relative positions of said second and fourth members; means selectively operable for operatively connecting said responsive means to either of said first and second motor means for moving their respective first and second members so that a predetermined relation is automatically maintained between said relative positions and for automatically regulating the engine thrust when said responsive means is connected to said first motor means; and means for restraining movement of said second member when said responsive means is operatively connected to said first motor means.

5. A control system for an aircraft jet engine having means operable to regulate its thrust output; said system comprising a mechanism having a neutral condition and subject to deviation from said condition; a first member movable for effecting operation of an aircraft jet engine thrust regulating means and for altering the deviation of said mechanism from said condition; a second member movable to alter the deviation of said mechanism from said condition; a third member movable in response to changes in flight speed for altering the deviation of said mechanism from said condition; first and second motor means operable for moving said first and second members respectively; means operative in response to deviation of said mechanism from said condition; and means selectively operable for operatively connecting said responsive means to either of said first and second motor means such that upon deviation of said mechanism from said condition the motor means connected to said responsive means is rendered operative to move its associated one of said first and second members in a direction for returning said mechanism toward said condition and for automatically regulating the engine thrust when said responsive means is connected to said first motor means.

6. A control system for an aircraft jet engine having means operable to regulate its thrust output; said system comprising an electric circuit; a first member movable for effecting operation of an aircraft jet engine thrust regulating means and for altering a condition of said circuit; a second member movable to alter said circuit condition; a third member movable in response to changes in flight speed for altering said circuit condition; first and second motor means operable for moving said first and second members respectively; means operative in response to deviation of said electric circuit from said condition; and means selectively operable for operatively connecting said responsive means to either of said first and second motor means such that upon deviation of said circuit from said condition the motor means connected to said responsive means is rendered operative to move its associated one of said first and second members in a direction for returning said circuit toward said condition and for automatically regulating the engine thrust when said responsive means is connected to said first motor means.

7. A control system for an aircraft engine having means operable to regulate its thrust output; said system comprising an electric bridge circuit; a first member movable for effecting operation of an aircraft jet engine thrust regulating means and for altering the balance condition of said circuit; a second member movable to alter said circuit balance condition; a third member movable in response to changes in flight speed for altering said circuit balance condition; first and second motor means operable for moving said first and second members respectively; means operative in response to unbalance of said circuit; and means selectively operable for operatively connecting said responsive means to either of said first and second motor means such that upon unbalance of said circuit the motor means connected to said responsive means is rendered operative to move its associated one of said first and second members in a direction for rebalancing said circuit and for automatically regulating the engine thrust when said responsive means is connected to said first motor means.

8. In an aircraft jet engine having means operable to regulate the engine fuel-air ratio to vary the engine thrust output; the combination therewith of mechanism for controlling the operation of said regulating means; said mechanism comprising an electric bridge circuit; a first member operatively connected to said regulating means and movable for varying said fuel-air ratio and at the same time altering the balance condition of said circuit; a second member movable to alter the balance condition of said circuit; a third member movable in response to changes in flight speed for altering said circuit balance condition; first and second motor means operable for moving said first and second members respectively; means operative in response to unbalance of said circuit; and means selectively operable for operatively connecting said responsive means to either of said first and second motor means such that upon unbalance of said circuit the motor means connected to said responsive means is rendered operative to move its associated one of said first and second members in a direction for rebalancing said circuit and for automatically regulating the engine thrust when said responsive means is connected to said first motor means.

9. A flight speed control system for an aircraft jet engine having means operable for varying its thrust output; said system comprising selectively operable means movable to and from a position in which the system is set for manual operation and a position in which the system is set for automatic operation; a member manually movable, when said selectively operable means is set for manual operation of the system, for effecting operation of said thrust regulating means; mechanism having a neutral condition and subject to deviation from said condition; said mechanism including first means connected to said member for movement therewith for altering the deviation of said mechanism from said condition, second means movable in response to changes in flight speed for altering the deviation of said mechanism from said condition and third means movable to alter the deviation of said mechanism from said condition; means responsive to deviation of said mechanism from said condition; a first motor operable for moving said third means and, when said selectively operable means is set for manual operation, said first motor is operatively connected to said responsive means such that upon deviation of said mechanism from said condition said first motor is rendered operative to move said third means in a direction for returning said mechanism toward said condition; and a second motor operable for moving said member and first means and, when said selectively operable means is set for automatic operation, said second motor is operatively connected to said responsive means such that upon deviation of said mechanism from said condition said second motor is rendered operative to move said member and first means for automatically regulating the engine thrust and for returning said mechanism toward said condition.

References Cited in the file of this patent

UNITED STATES PATENTS

| | | |
|---|---|---|
| 2,626,767 | Bromley | Jan. 27, 1953 |
| 2,664,254 | Hendrickson | Dec. 29, 1953 |
| 2,667,228 | Wood et al. | Jan. 26, 1954 |
| 2,687,612 | Anderson et al. | Aug. 31, 1954 |
| 2,693,675 | Schaffer | Nov. 9, 1954 |
| 2,694,900 | Brandau | Nov. 23, 1954 |
| 2,700,276 | Bobier | Jan. 25, 1955 |